(12) United States Patent
Jeong et al.

(10) Patent No.: US 9,028,916 B2
(45) Date of Patent: May 12, 2015

(54) METHOD FOR SYNTHESIZING CARBON NANOWIRES ON SURFACE OF PORES OR GAPS IN STRUCTURE

(71) Applicants: Nam Jo Jeong, Daejeon (KR); Se Young Kim, Daejeon (KR); In Sub Han, Chubu-myeon (KR); Sang Kuk Woo, Daejeon (KR); Doo Won Seo, Daejeon (KR)

(72) Inventors: Nam Jo Jeong, Daejeon (KR); Se Young Kim, Daejeon (KR); In Sub Han, Chubu-myeon (KR); Sang Kuk Woo, Daejeon (KR); Doo Won Seo, Daejeon (KR)

(73) Assignee: Korea Institute of Energy Research, Jang-dong, Yuseong-gu, Dajeon (KR)

( * ) Notice: Subject to any disclaimer, the term of this patent is extended or adjusted under 35 U.S.C. 154(b) by 0 days.

(21) Appl. No.: 14/034,656

(22) Filed: Sep. 24, 2013

(65) Prior Publication Data

US 2014/0099441 A1    Apr. 10, 2014

(30) Foreign Application Priority Data

Oct. 9, 2012 (KR) .................. 10-2012-0111932

(51) Int. Cl.
*C23C 16/26* (2006.01)
*C23C 16/40* (2006.01)
(Continued)

(52) U.S. Cl.
CPC ............ *C01B 31/0226* (2013.01); *B01J 21/066* (2013.01); *B01J 21/185* (2013.01); *B01J 23/06* (2013.01); *B01J 23/08* (2013.01); *B01J 23/14* (2013.01); *B01J 23/18* (2013.01); *B01J 23/72* (2013.01); *B01J 23/74* (2013.01); *B01J 23/755* (2013.01); *B01J 23/835* (2013.01); *B01J 35/0013* (2013.01); *B01J 35/002* (2013.01); *B01J 35/006* (2013.01); *B01J 35/10* (2013.01); *B01J 37/0211* (2013.01); *C01B 31/0233* (2013.01); *C01B 2202/34* (2013.01);
(Continued)

(58) Field of Classification Search
CPC ................................. C23C 16/26; C23C 16/40
USPC ................................. 427/249.1, 249.3, 249.4
See application file for complete search history.

(56) References Cited

U.S. PATENT DOCUMENTS

| | | | | |
|---|---|---|---|---|
| 7,301,191 | B1 * | 11/2007 | Tombler et al. | 257/296 |
| 2004/0028812 | A1 * | 2/2004 | Wessels et al. | 427/248.1 |

(Continued)

FOREIGN PATENT DOCUMENTS

| | | |
|---|---|---|
| EP | 2719660 A1 | 4/2014 |
| EP | DP2719660 | 4/2014 |

(Continued)

OTHER PUBLICATIONS

Liu, Haijing, et al., "Direct synthesis of mesoporous carbon nanowires in nanotubes usign MnO2 nanotubes as a template and their application in supercapacitors". Chem. Commun., 2009, 6813-6815.*

(Continued)

*Primary Examiner* — Bret Chen
(74) *Attorney, Agent, or Firm* — IP Attorneys Group, LLC

(57) ABSTRACT

A method for synthesizing carbon nanowires directly on the internal surface of a three-dimensional structure including a carbon structure and, more particularly, to a method for synthesizing carbon nanowires on the surface of pores or gaps present in a structure. According to the present invention, it is possible to fill fine pores or gaps in a structure, which cause a reduction in mechanical properties or conductivity, with high-density carbon nanowires, thus significantly improving mechanical or electrical performance of a final product.

14 Claims, 6 Drawing Sheets

(51) Int. Cl.
*C01B 31/02* (2006.01)
*B01J 23/14* (2006.01)
*B01J 23/72* (2006.01)
*B01J 23/755* (2006.01)
*B01J 23/835* (2006.01)
*B01J 35/00* (2006.01)
*B01J 37/02* (2006.01)
*D01D 5/00* (2006.01)
*D01F 9/127* (2006.01)
*D01F 9/133* (2006.01)
*B82Y 30/00* (2011.01)
*B82Y 40/00* (2011.01)
*B01J 21/06* (2006.01)
*B01J 21/18* (2006.01)
*B01J 23/06* (2006.01)
*B01J 23/08* (2006.01)
*B01J 23/18* (2006.01)
*B01J 23/74* (2006.01)
*B01J 35/10* (2006.01)

(52) U.S. Cl.
CPC ............ *C01B2202/36* (2013.01); *D01D 5/00* (2013.01); *D01F 9/127* (2013.01); *D01F 9/133* (2013.01); *B82Y 30/00* (2013.01); *B82Y 40/00* (2013.01)

(56) References Cited

U.S. PATENT DOCUMENTS

2009/0053512 A1* 2/2009 Pyun et al. .................... 428/336
2011/0129759 A1* 6/2011 Hwang et al. ................. 429/483
2011/0162957 A1* 7/2011 Wardle et al. ............ 204/157.63

FOREIGN PATENT DOCUMENTS

| GB | 2399092 A | 9/2004 |
| KR | 10-0829001 B1 | 5/2008 |
| WO | WO2004/083113 A1 | 9/2004 |

OTHER PUBLICATIONS

Tilmaciu, Carmen-Mihaela, et al., "Synthesis of superparamagnetic iron(III) oxide nanowires in double-walled carbon nanotubes". Chem. Commun., 2009, 6664-6666.*

Compagnini, G., et al., "Synthesis of carbon nanowires and nanotubes by plasma ignition in liquid environments". Journal of Optoelectronics and Advanced Materials, vol. 12, No. 3, Mar. 2010, pp. 456-460.*

Englander, Ongi, et al., "Local synthesis of silicon nanowires and carbon nanotubes on microbridges". Applied Physics Letters, vol. 82, No. 26, Jun. 30, 2003.*

Siddiqui, Sumaira Masood, et al., "Low temperature template assisted synthesis of carbon nanowires having different functionality." J. Polym Res (2012) 19:9949, pp. 1-8.*

Korean Intellectual Property Office. Office Action Received in Korean Application No. 10-2012-0111932. Sep. 30, 2013. Republic of Korea.

Ma, et al, "Catalytic Growth of Carbon Nanofibers on a Porous Carbon Nanotubes Substrate", Journal of Materials Science Letters, 19 (2000), 1929-1931.

* cited by examiner

METHOD FOR SYNTHESIZING CARBON NANOWIRES ON SURFACE OF PORES OR GAPS IN STRUCTURE

CROSS-REFERENCE TO RELATED PATENT APPLICATION

This application claims priority under 35 USC 119 and/or 365 of Korean Patent Application No. 10-2012-0111932 filed on Oct. 9, 2012 in the Korean Intellectual Property Office. The contents of the above-identified Application are relied upon and incorporated herein in their entirety by reference.

BACKGROUND OF THE INVENTION

1. Field of the Invention

The present invention relates to a method for synthesizing carbon nanowires directly on the internal surface of a three-dimensional structure including a carbon structure and, more particularly, to a method for synthesizing carbon nanowires at high density on the surface of pores or gaps present in a structure, and a hierarchical structure synthesized by the method.

According to the present invention, it is possible to fill fine pores or gaps in a structure, which cause a reduction in mechanical properties or conductivity, with high-density carbon nanowires, thus significantly improving mechanical or electrical performance of a final product.

2. Description of the Related Art

Carbon nanowires are generally classified into carbon nanofibers and carbon nanotubes and can be synthesized by various methods. In order to be practically applied in various fields, the carbon nanowires should be assembled on the surface of a structure with various materials and shapes by a method such as synthesis, coating, etc.

In general, the method for assembling carbon nanowires on a macro-scale three-dimensional structure may be generally divided into a method for forming various types of solutions or pastes using carbon nanowire powder and coating the solutions or pastes on the surface of a desired structure and a method for synthesizing carbon nanowires directly on the surface of a structure.

The method for coating the carbon nanowires on the surface of the structure can maximize the adhesion with the surface of the structure, but the carbon nanowires may be mixed with other undesirable substances. In particular, in a three-dimensional structure having many pores or gaps therein, it is most likely that surface heterogeneity occurs due to agglomeration of nanoparticles caused by surface tension, thus making it difficult to obtain a uniform performance of the structure.

Meanwhile, a catalyst is generally used in the method for synthesizing carbon nanowires directly on the surface of the structure. For example, a solution containing a component that can act as a catalyst may be coated on the surface of a structure, followed by heat treatment to obtain nano-sized catalyst particles, or nanoparticles that can act as a catalyst may be coated directly on the surface of the structure.

However, according to the above conventional methods, in the case of the structure having many pores or gaps therein, such as a carbon composite material comprising carbon fibers, it is difficult to synthesize carbon nanowires at high density on the surface of pores or gaps, thus causing a reduction in mechanical properties or conductivity of a final product.

SUMMARY OF THE INVENTION

The present invention has been made in an effort to solve the above-described problems associated with prior art, and an object of the present invention is to provide a method which can uniformly coat a nano-catalyst on the surface of pores or gaps present in a structure such as a carbon body or composites thereof and can synthesize carbon nanowires at high density on the surface of the pores or gaps present in the structure using a simple chemical vapor deposition method, and a hierarchical structure synthesized by the method.

To achieve the above-described object, the present invention provides a method for synthesizing carbon nanowires at high density on the surface of pores or gaps present in a structure, the method comprising the steps of: (i) coating metal oxide nanoparticles on the surface of pores or gaps in a structure by infiltrating a metal oxide nanoparticle solution into the structure having the pores or gaps and drying the resulting structure; (ii) locating the structure coated with the metal oxide nanoparticles in a reactor and increasing the temperature in the reactor to a synthesis temperature in a vacuum atmosphere; and (iii) synthesizing carbon nanowires at high density in the pores or gaps of the structure by supplying a carbon source into the reactor reaching the synthesis temperature and instantaneously converting the pressure condition in the reactor to a pressurization condition, and a hierarchical structure comprising carbon nanowires synthesized at high density on the surface of pores or gaps therein by the method.

Here, the structure may preferably be a carbon structure having pores or gaps therein, and the carbon structure may preferably include carbon foam, carbon aerogel, carbon fiber paper, carbon composites, etc.

Moreover, the metal oxide nanoparticle solution may preferably be an ethanol solution at a concentration of 0.1 to 1 M. The metal oxide nanoparticles coated on the surface of the structure may preferably include at least one selected from the group consisting of nickel oxide, copper oxide, iron oxide, cobalt oxide, tin oxide, zirconium oxide, indium oxide, zinc oxide, lead oxide, bismuth oxide, and a mixture thereof, and their size may preferably be controlled within a range of 10 to 200 nm, Furthermore, the step of infiltrating the metal oxide nanoparticle solution into the structure may be achieved by immersing the structure in the metal oxide nanoparticle solution and creating a vacuum atmosphere such that the solution can be sufficiently absorbed in the pores or gaps of the structure. Here, the vacuum atmosphere, at which the metal oxide nanoparticle solution can be sufficiently absorbed in the pores or gaps of the structure, may preferably be within a range of $1\times10^{-7}$ to 300 Torr.

Meanwhile, in the step of increasing the temperature in the reactor to the synthesis temperature in the vacuum atmosphere, the vacuum atmosphere may preferably be controlled within a range of $1\times10^5$ to 100 Torr such that the partial pressure of the pores or gaps in the structure can be maintained low, and the synthesis temperature in the reactor for the synthesis of carbon nanowires may preferably be controlled within a range of 500 to 1000° C.

In addition, in the step of converting the pressure condition in the reactor to the pressurization condition, the pressurization condition in the reactor may preferably be controlled within a range of 1.1 to 5 atm such that the reactant gas can be sufficiently introduced into the pores or gaps having a very low partial pressure in a high vacuum condition, and the time during which the pressure condition in the reactor in the vacuum atmosphere is converted to the pressurization condition may preferably be controlled within a range of 1 to 60 seconds.

Here, the carbon source, supplied while the pressure condition in the reactor in the vacuum atmosphere is rapidly converted to the pressurization condition, is sufficiently introduced into the pores or gaps in the structure, and the carbon source, introduced into the pores or gaps, and the metal oxide nanoparticles, coated on the surface of the pores or gaps, are decomposed such that the metal oxide nanoparticles are reduced to pure metal particles to act as a highly active catalyst and the carbon source reacts with the catalyst to be diffused into carbon nanowires as solid carbide.

The carbon sources for the diffusion into the carbon nanowires may preferably include at least one selected from the group consisting of acetylene, ethylene, propane, methane, ethanol, and a mixture thereof, and the reaction time during which the carbon nanowires are synthesized at high density in the pores or gaps of the structure may preferably be controlled within a range of 1 minute to 4 hours.

The carbon nanowires synthesized on the surface of the pores or gaps in the structure by the above-described method may preferably have an average diameter of 10 to 200 nm and a length of 10 to 500 μm and can be applied in various fields such as a carbon-reinforced composite material, an electrode material, a catalyst structure, a water treatment material, a filter material, a medical material, an adsorbent material, etc.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

Hereinafter, a method for synthesizing carbon nanowires at high density on the surface of pores or gaps present in a structure and a hierarchical structure synthesized by the method according to the present invention will be described with reference to the accompanying drawings.

Figure 1:
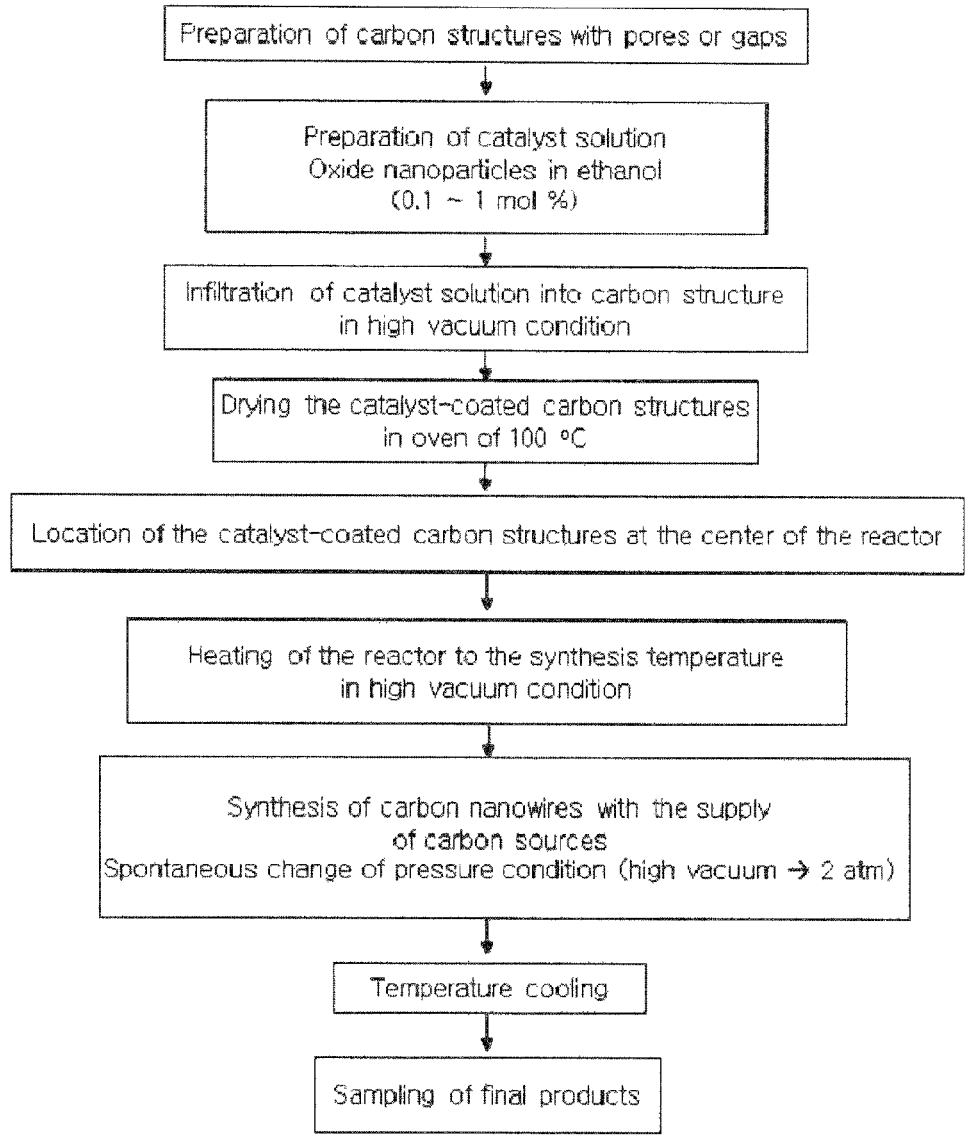
FIG. 1 is a flowchart showing an embodiment of a production process according to the present invention.

As shown in FIG. 1 a method for synthesizing carbon nanowires at high density on the surface of pores or gaps present in a structure according to the present invention includes the steps of: (i) coating metal oxide nanoparticles on the surface of pores or gaps in a structure by infiltrating a metal oxide nanoparticle solution into the structure having the pores or gaps and drying the resulting structure; (ii) locating the structure coated with the metal oxide nanoparticles in a reactor and increasing the temperature in the reactor to a synthesis temperature in a vacuum atmosphere; and (iii) synthesizing carbon nanowires at high density in the pores or gaps of the structure by supplying a carbon source into the reactor reaching the synthesis temperature and instantaneously converting the pressure condition in the reactor into a pressurization condition.

Here, the structure may be one of various three-dimensional structures having pores or gaps therein and may preferably include carbon foam, carbon aerogel, carbon fiber paper, or carbon composites.

Moreover, the concentration of the metal oxide nanoparticle solution infiltrated into the structure may preferably be controlled within a range of 0.1 to 1 M so as to be uniformly coated at high density on the surface of the structure in the drying process, and the solvent may be ethanol.

Here, the metal oxide nanoparticles coated on the surface of the structure may include various metal oxides that can act as a catalyst for diffusing carbon nanowires and may preferably include at least one selected from the group consisting of nickel oxide, copper oxide, iron oxide, cobalt oxide, tin oxide, zirconium oxide, indium oxide, zinc oxide, lead oxide, bismuth oxide, and a mixture thereof, and the size of the metal oxide nanoparticles may preferably be controlled within a range of 10 to 200 nm.

Meanwhile, the step of infiltrating the metal oxide nanoparticle solution into the structure may be achieved by immersing the structure in the metal oxide nanoparticle solution and creating a vacuum atmosphere such that the solution can be sufficiently absorbed in the pores or gaps of the structure. Then, the structure on which the metal oxide nanoparticles are uniformly coated at high density may be obtained by drying the resulting structure. Here, the vacuum atmosphere, at which the metal oxide nanoparticle solution can be sufficiently absorbed in the pores or gaps of the structure, may preferably be within a range of $1 \times 10^{-7}$ to 300 Torr.

The carbon structure in which the metal oxide nanoparticles are uniformly coated to the inside in the above manner is placed in a reactor and heated to a synthesis temperature. Here, the reactor may preferably be maintained in a vacuum atmosphere such that the partial pressure of the pore or gaps in the carbon structure can be maintained very low.

The vacuum atmosphere may preferably be controlled within a range of $1 \times 10^{-5}$ to 100 Torr such that the partial pressure of the pores or gaps in the structure can be maintained low, and the synthesis temperature in the reactor may preferably be controlled within a range of 500 to 1000° C.

Here, in the step of increasing the temperature in the reactor to the synthesis temperature in the vacuum atmosphere, the vacuum atmosphere may preferably be controlled within a range of $1 \times 10^{-5}$ to 100 Torr such that the partial pressure of the pores or gaps in the structure can be maintained low, and the synthesis temperature in the reactor for the synthesis of carbon nanowires may preferably be controlled within a range of 500 to 1000° C.

When the temperature in the reactor reaches the synthesis temperature, the pressure condition in the reactor is instantaneously converted to a pressurization condition, and in this process, the reactant gas can be sufficiently introduced into the pores or gaps in the structure in which the partial pressure is low. Here, the pressurization condition in the reactor may preferably be controlled within a range of 1.1 to 5 atm such that the reactant gas can be rapidly and efficiently introduced into the pores or gaps having a very low partial pressure in the vacuum atmosphere. Moreover, the time during which the pressure condition in the reactor in the vacuum atmosphere is converted to the pressurization condition may preferably be controlled within a range of 1 to 60 seconds.

The carbon source introduced into the pores or gaps and the metal oxide nanoparticles coated on the surface of the pores or gaps are decomposed. Here, the metal oxide nanoparticles are reduced to pure metal particles to act as a highly active catalyst, and the carbon source reacts with the catalyst to be diffused into carbon nanowires as solid carbide.

The carbon sources for the diffusion into the carbon nanowires may preferably include at least one selected from the group consisting of acetylene, ethylene, propane, methane, ethanol, and a mixture thereof, and the reaction time during which the carbon nanowires are synthesized at high density in the pores or gaps of the structure may preferably be controlled within a range of 1 minute to 4 hours.

Figure 2:
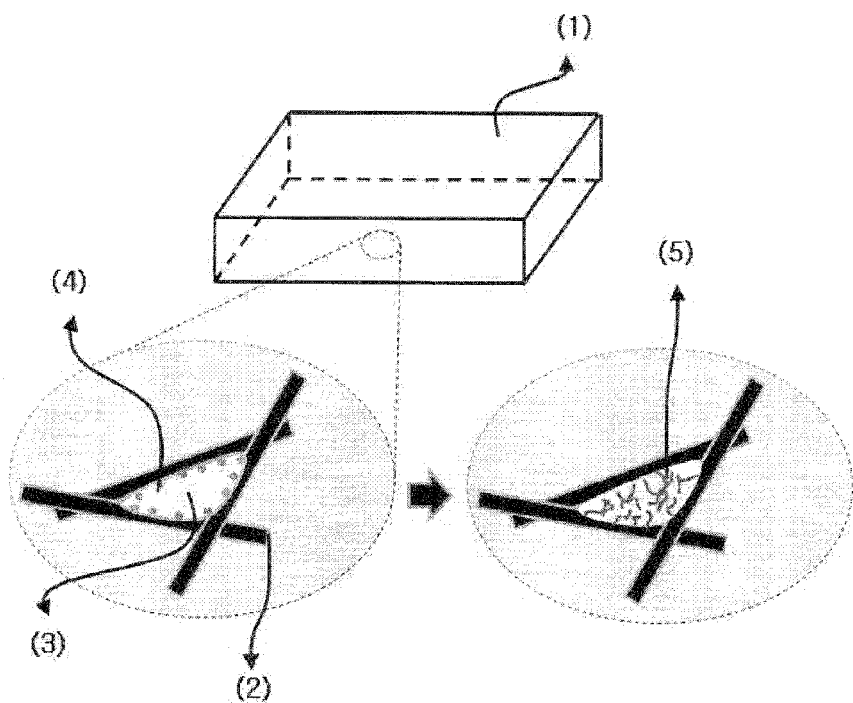
FIG. 2 is a diagram showing a synthetic concept according to the method as shown in FIG. 1.

FIG. 2 is a conceptual diagram showing the carbon nanowires synthesized on the surface of the pores or gaps according to the present invention, and the thus synthesized carbon nanowires may preferably have an average diameter of 10 to 200 nm and a length of 10 to 500 μm and can be applied in various fields such as a carbon-. reinforced composite material, an electrode material, a catalyst structure, a water treatment material, a filter material, a medical material, an adsorbent material, etc.

Next, carbon nanowires synthesized at high density on the surface of pores or gaps in a structure according to the following Examples of the present invention will be described in detail. The scope of the present invention is not limited to the following Examples, and it will be understood by those skilled in the art that various changes in form and details may be made therein without departing from the spirit and scope of the invention as defined by the appended claims

Example 1

SEM Images of Carbon Nanowires Synthesized Using NiO Nanoparticles

Figure 3:
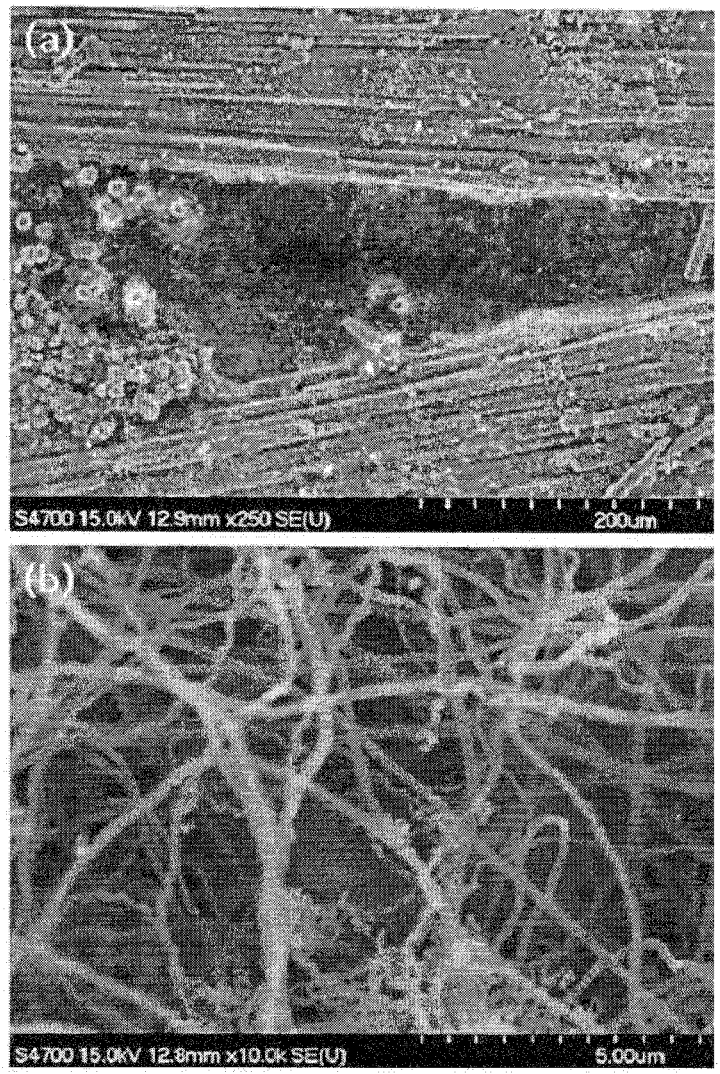
FIG. 3 shows scanning electron microscopy (SEM) images of carbon nanowires synthesized using NiO nanoparticles according to the method as shown in FIG. 1 (a: low magnification, b: high magnification)

FIG. 3 shows SEM images of carbon nanowires synthesized using NiO nanoparticles according to the present invention. The synthesis temperature was 750° C., the synthesis pressure was 2 atm, and the synthesis gas used was acetylene.

In FIG. 3(a), it can be seen that carbon nanowires were densely grown in gaps present in a carbon composite. FIG. 3(b) shows a high-magnification image of the grown carbon wires, from which it can be seen that various types of carbon nanowires were synthesized and their size was up to several tens of microns.

Example 2

TEM images of Carbon Nanowires Synthesized Using NiO Nanoparticles

Figure 4:
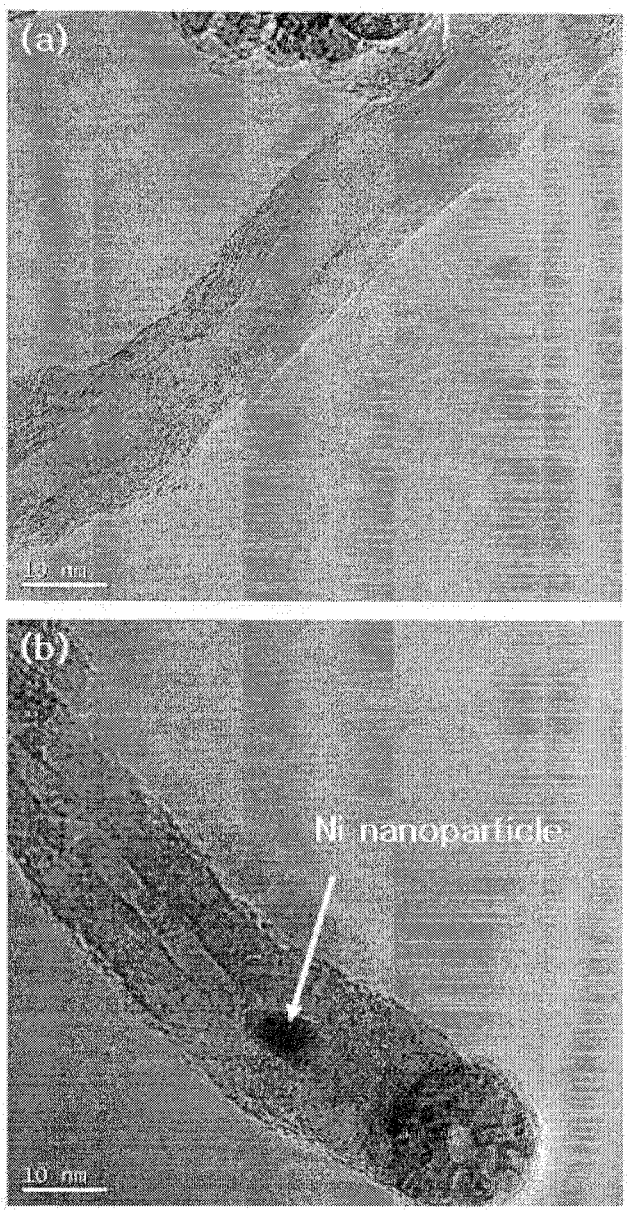
FIG. 4 shows transmission electron microscopy (TEM) images of carbon nanowires synthesized using NiO nanoparticles according to the method as shown in FIG. 1 (a: carbon nanotubes, b: nickel nanoparticles)

FIG. 4 shows TEM images of carbon nanowires synthesized using NiO nanoparticles according to the present invention. The synthesis temperature was 750° C., the synthesis pressure was 2 atm, and the synthesis gas used was acetylene.

In FIG. 4(a), it can be seen that the grown carbon nanowires have the form of tubes. Moreover, a nickel nano-catalyst used for the synthesis of these carbon nanotubes is seen in FIG. 4(b), and it can be seen through further analysis that nanoparticles, which were nickel oxide before the synthesis, were converted into nickel metal particles after the synthesis.

Example 3

Figure 5:
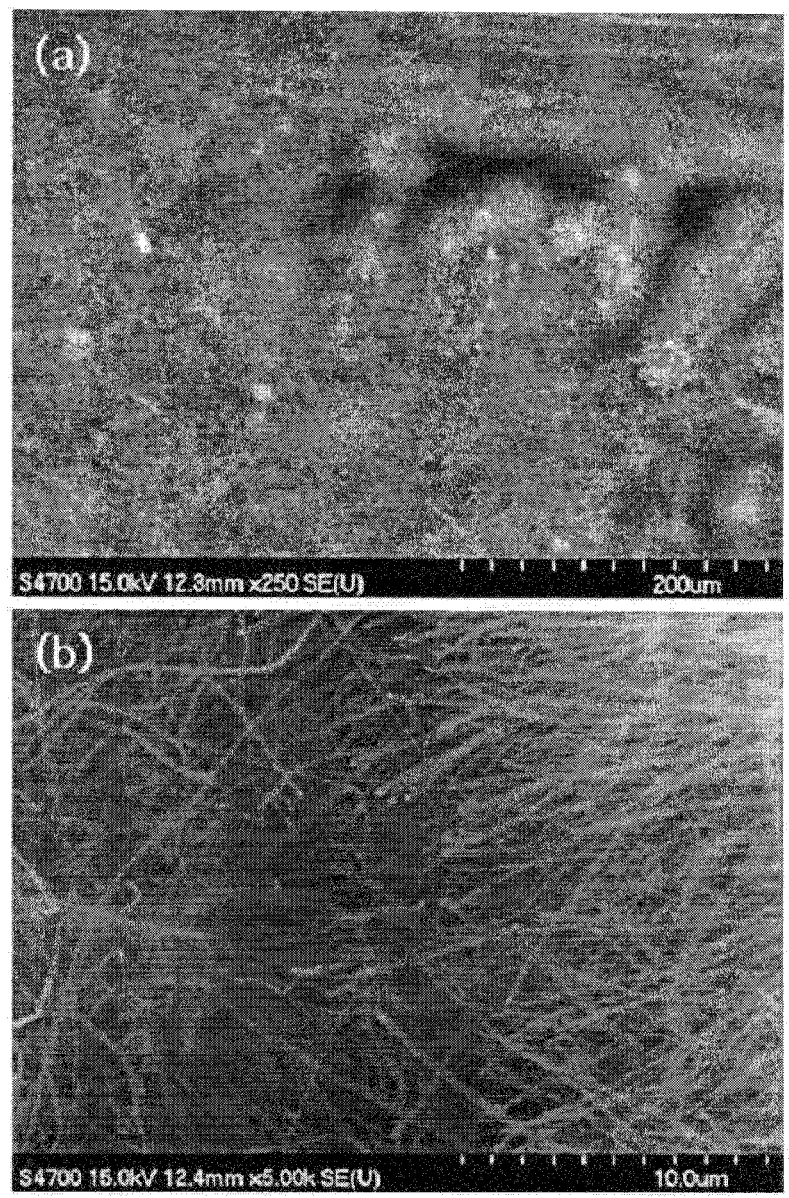
FIG. 5 shows SEM images of carbon nanowires synthesized using CuO and $SnO_2$ nanoparticles according to the method as shown in FIG. 1 (a: low magnification, b: high magnification)

SEM Images of Carbon Nanowires Synthesized Using CuO and SnO$_2$ Nanoparticles FIG. 5 shows SEM images of carbon nanowires synthesized using CuO and SnO$_2$ nanoparticles according to the present invention. The synthesis temperature was 750° C., the synthesis pressure was 2 atm, and the synthesis gas used was acetylene.

It can be seen from the low-magnification image of FIG. 5(a) that carbon nanowires were very densely grown and most of gaps were filled with the grown carbon nanowires. Moreover, the high-magnification image of FIG. 5(b) shows that the grown carbon nanowires were grown relatively straight.

This structure is different from the results obtained when nickel oxide was used. Moreover, it can be seen that the catalyst particles used for the synthesis are hanging on the tips of carbon nanowires, from which it can be seen that the grown carbon nanotubes were synthesized by tip-growth mechanism.

Example 4

Figure 6:
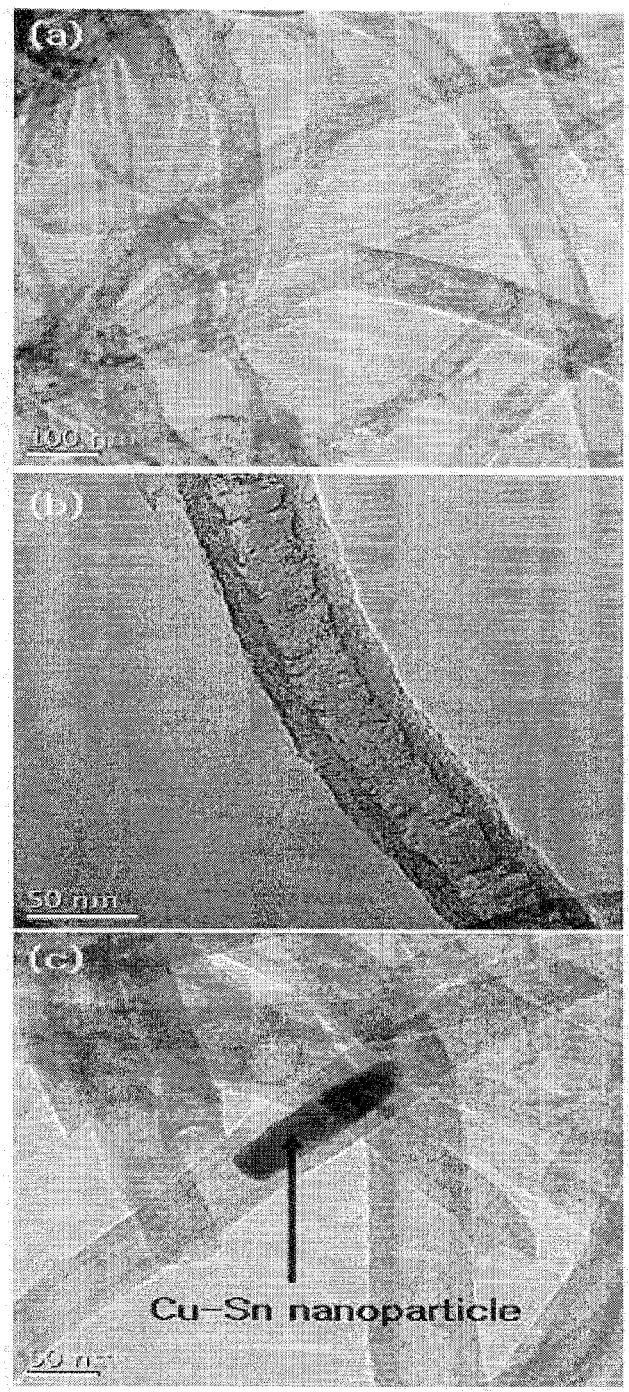
FIG. 6 shows TEM images of carbon nanowires synthesized using CuO and $SnO_2$ nanoparticles according to the method as shown in FIG. 1 (a: low magnification, b: high magnification, c: Cu-Sn alloy nanoparticles).

TEM Images of Carbon Nanowires Synthesized Using CuO and SnO$_2$ Nanoparticles FIG. 6 shows TEM images of carbon nanowires synthesized using CuO and SnO$_2$ nanoparticles according to the present invention. The synthesis temperature was 750° C., the synthesis pressure was 2 atm, and the synthesis gas used was acetylene.

It can be seen from the low-magnification image of FIG. 6(a) that many thin carbon nano-layers were formed in carbon nanowires. Carbon nanofibers were partially observed. This structure can be clearly seen from the high-magnification image of FIG. 6(b). Moreover, it can be seen from FIG. 6(c) that the used nano-catalyst was included in the carbon nanowires.

It can be seen through further analysis that these carbon nanotubes were alloys of copper and tin, and these results show that metal oxide nanoparticles were converted into the form of alloys during the synthesis to synthesize carbon nanotubes, from which it can be seen that the method for synthesizing carbon nanowires using various metal oxide nanoparticles according to the present invention can be performed.

As can be seen from the characteristics shown in the above Examples, the structure of the present invention on which the carbon nanowires are formed can be used in various fields and systems such as in the fields of catalysis, material separation, etc. and can significantly improve mechanical or electrical performance of a final product.

As described above, according to the present invention, it is possible to fill fine pores or gaps, which are present in a three-dimensional structure such as a carbon body or composites thereof and cause a reduction in mechanical properties or conductivity of a final product, with high-density carbon nanowires, thus significantly improving the mechanical or electrical performance of the final product.

Moreover, according to the present invention, it is possible to uniformly coat a nano-catalyst on the surface of pores or gaps present in a carbon body or composites thereof and prepare a hierarchical structure comprising carbon nanowires synthesized at high density on the surface of the pores or gaps present in the structure using a simple chemical vapor deposition method.

While the invention has been shown and described with reference to certain preferred embodiments thereof, it will be understood by those skilled in the art that various changes in form and details may be made therein without departing from the spirit and scope of the invention as defined by the appended claims. Therefore, the scope of the invention is defined not by the detailed description of the invention but by the appended claims, and all differences within the scope will be construed as being included in the present invention.

What is claimed is:

1. A method for synthesizing carbon nanowires on the surface of pores or gaps present in a structure, the method comprising the steps of:
   (i) coating metal oxide nanoparticles on the surface of pores or gaps in a structure by infiltrating a metal oxide nanoparticle solution into the structure having the pores or gaps and drying the resulting structure;
   (ii) locating the structure coated with the metal oxide nanoparticles in a reactor and increasing the temperature in the reactor to a synthesis temperature in a vacuum atmosphere;
   (iii) synthesizing carbon nanowires in the pores or gaps of the structure by supplying a carbon source into the reactor and instantaneously converting the pressure condition in the reactor to a pressurization condition,
   wherein in the (iii) synthesizing step, the pressurization condition in the reactor is within a range of 1.1 to 5 atm.

2. The method of claim 1, wherein the structure is a carbon structure having pores or gaps therein.

3. The method of claim 2, wherein the carbon structure comprises carbon foam, carbon aerogel, carbon fiber paper, or carbon composites.

4. The method of claim 1, wherein the metal oxide nanoparticle solution is an ethanol solution at a concentration of 0.1 to 1 M.

5. The method of claim 1, wherein the metal oxide nanoparticles coated on the surface of the structure have a size of 10 to 200 nm.

6. The method of claim 1, wherein the metal oxide nanoparticles coated on the surface of the structure comprise at least one selected from the group consisting of nickel oxide, copper oxide, iron oxide, cobalt oxide, tin oxide, zirconium oxide, indium oxide, zinc oxide, lead oxide, bismuth oxide, and a mixture thereof.

7. The method of claim 1, wherein the step of infiltrating the metal oxide nanoparticle solution into the structure is achieved by immersing the structure in the metal oxide nanoparticle solution and then creating a vacuum atmosphere such that the solution can be sufficiently absorbed in the pores or gaps of the structure.

8. The method of claim 7, wherein the vacuum atmosphere is controlled within a range of $1 \times 10^{-7}$ to 300 Torr.

9. The method of claim 1, wherein in the step of locating the structure coated with the metal oxide nanoparticles in the reactor and increasing the temperature in the reactor to the synthesis temperature in the vacuum atmosphere, the vacuum atmosphere is controlled within a range of $1 \times 10^{-5}$ to 100 Torr.

10. The method of claim 1, wherein the synthesis temperature in the reactor is controlled within a range of 500 to 1000° C.

11. The method of claim 1, wherein the time during which the pressure condition in the reactor in the vacuum atmosphere is converted to the pressurization condition is controlled within a range of 1 to 60 seconds.

12. The method of claim 11, wherein the carbon source, supplied while the pressure condition in the reactor in the vacuum atmosphere is rapidly converted to the pressurization condition, is sufficiently introduced into the pores or gaps in the structure, and wherein the carbon source, introduced into the pores or gaps, and the metal oxide nanoparticles, coated on the surface of the pores or gaps, are decomposed such that the metal oxide nanoparticles are reduced to pure metal particles to act as a highly active catalyst and the carbon source reacts with the catalyst to be diffused into carbon nanowires as solid carbide.

13. The method of claim 1, wherein the carbon source comprise at least one selected from the group consisting of acetylene, ethylene, propane, methane, ethanol, and a mixture thereof.

14. The method of claim 1, wherein the reaction time during which the carbon nanowires are synthesized in the pores or gaps of the structure is controlled within a range of 1 minute to 4 hours.

* * * * *